United States Patent [19]

Barber

[11] 4,014,667
[45] Mar. 29, 1977

[54] ANTIFREEZE RECOVERY SYSTEM

[75] Inventor: Franklin T. Barber, Bartlesville, Okla.

[73] Assignee: Phillips Petroleum Company, Bartlesville, Okla.

[22] Filed: June 16, 1975

[21] Appl. No.: 587,180

[52] U.S. Cl. .................................. 55/32; 203/18; 203/25; 203/71; 260/643 D

[51] Int. Cl.² .......................................... B01D 3/38

[58] Field of Search ............... 55/29, 32, 46, 48, 51, 55/31; 203/18, 25, 71; 260/643 R, 643 D

[56] References Cited

UNITED STATES PATENTS

| | | | |
|---|---|---|---|
| 3,092,667 | 6/1963 | Murphy | 260/643 D X |
| 3,230,156 | 1/1966 | Katzen | 260/643 R X |
| 3,434,934 | 3/1969 | Washer | 203/71 X |
| 3,442,770 | 5/1969 | Wentworth et al. | 203/18 X |
| 3,531,915 | 10/1970 | Nagel et al. | 55/32 |
| 3,555,837 | 1/1971 | McClintock | 203/25 X |
| 3,886,757 | 6/1975 | McClintock et al. | 55/31 X |

Primary Examiner—Charles N. Hart
Assistant Examiner—Robert H. Spitzer

[57] ABSTRACT

Antifreeze agents such as methanol used in treating hydrocarbon-containing streams to prevent the formation of hydrates and ice are recovered in a combination process comprising extraction, fractionation, and stripping together with a common reboiler system for the fractionation and stripping. One process comprises a combination of solvent extracting methanol with water, fractionation of the water-methanol extract to separate methanol overhead, further treatment of the fractionation bottoms by stripping to remove residual methanol overhead which is returned to the fractionation zone, and recycling at least a portion of the fractionation bottoms as solvent to the initial extraction step.

7 Claims, 1 Drawing Figure

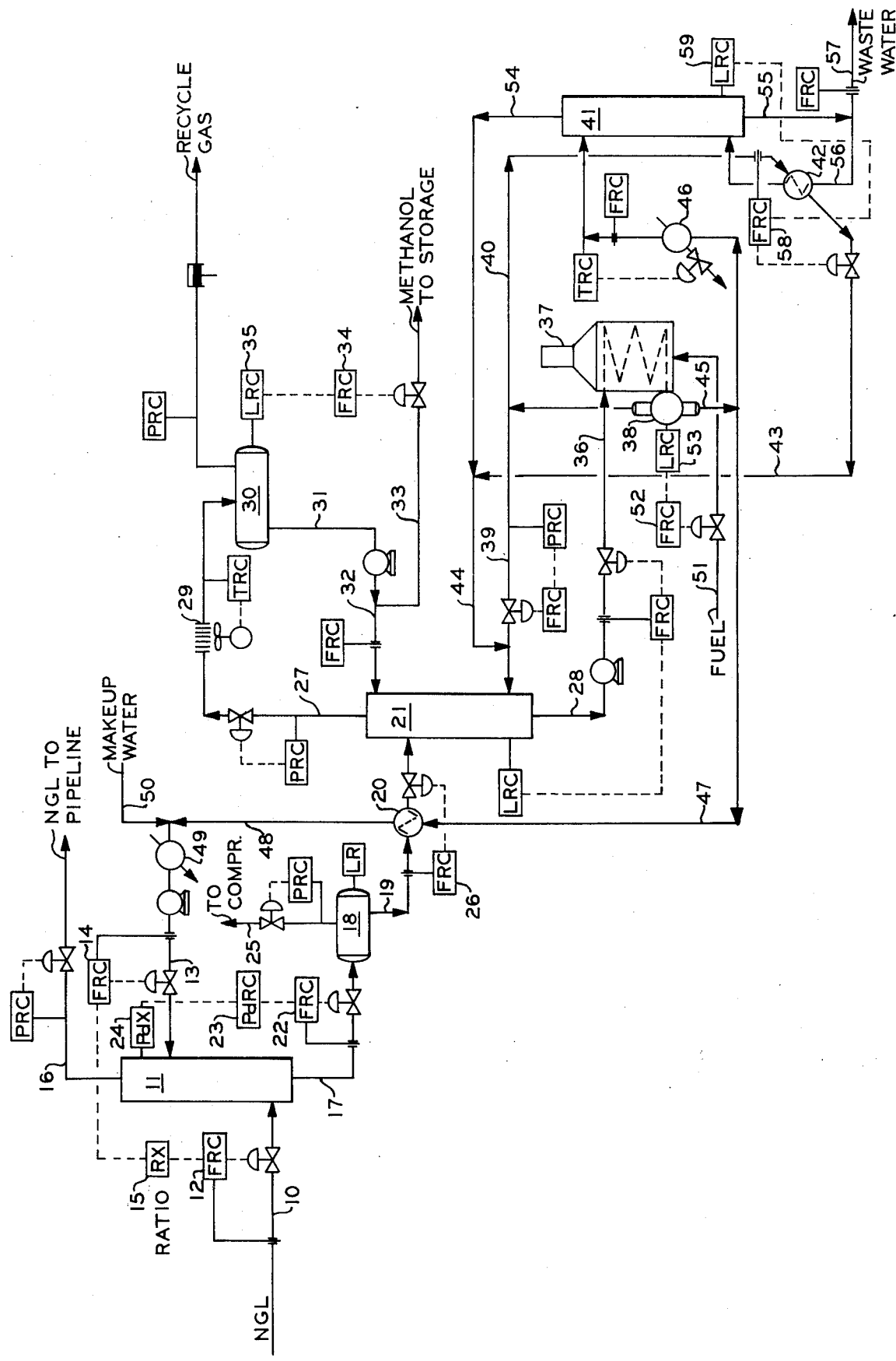

ANTIFREEZE RECOVERY SYSTEM

This invention relates to reducing the moisture content of gases and to the recovery of antifreeze agents used in the treatment of hydrocarbon-containing streams subject to hydrate and ice formation. In accordance with another aspect, this invention relates to a combination process for the recovery of antifreeze agents from hydrocarbon-containing streams comprising extraction, fractionation, and stripping. In accordance with a further aspect, this invention relates to a combination process for the recovery of methanol from hydrocarbon-containing streams by water extraction followed by fractionation and stripping together with a common reboiler system for supplying heat to both the fractionation and stripping zone. In accordance with a further aspect, a bottoms from a fractionation zone utilized for the separation of methanol from water is heated to produce steam and a portion of the steam thus produced which contains residual amounts of methanol is passed directly to the fractionation zone as a source of reboiler heat and another portion of the steam is passed in indirect heat exchange relationship with a stripping zone as a source of reboiler heat and then the steam thus heat-exchanged is passed directly to the fractionation zone. In accordance with another aspect, the overhead vaporous stream comprising methanol and some steam recovered from the stripping zone in said combination process is passed directly to the fractionation zone in said combination process as at least a portion of the reboiler heat.

It is well known to refrigerate gas streams to facilitate the separation of impurities therefrom, or to facilitate the separation of the various components in gas mixtures. For example, it is common practice to refrigerate a natural gas stream to a temperature low enough to condense some of the heavier hydrocarbons such as propane and heavier which are contained therein. The liquefied hydrocarbons are then easily separated from the gaseous residue consisting essentially of methane together with some ethane. If desired, the gas stream can be cooled to a temperature sufficient to condense some or all of the ethane. One problem in reducing the temperature of natural gas streams much below 32° F (0° C) is the condensation of water vapor usually contained therein, with resultant freezing thereof to form ice crystals and/or water-hydrocarbon-hydrate crystals. Water-hydrocarbon-hydrate crystals are usually formed at temperatures above 32° F (0° C), sometimes as high as 70° F (21.1° C). Said solid crystals plug the heat exchangers in the chilling or cooling system and make operation thereof impossible after a very short time. Carbon dioxide and hydrogen sulfide, if present in the gas, will also freeze out of the gas if it is cooled to sufficiently low temperatures, e.g., in the order of −115° F (−82° C).

The formation of such solid deposits in natural gas low temperature processing plants has been alleviated in the past by removing as much of the water and carbon dioxide as possible before the natural gas feedstock is cooled below the temperature at which said solids begin to form. One method which has been employed for accomplishing this comprises contacting the gas with high boiling (low vapor pressure) liquid desiccants such as diethylene glycol or triethylene glycol to absorb the water. High boiling desiccants are used in such processes so as to minimize introduction of the desiccant into the gas stream by evaporation. Such processes have the disadvantage of high operating costs, particularly in the recovery and regeneration of the desiccant. In addition, glycols become very viscous at low temperatures and present a handling problem. Another method which has been employed is to pass the gas through towers containing solid adsorbents such as silica gel, molecular sieve, solid caustic, etc. Such adsorbents and the operating expenses associated with the use thereof are expensive. Because of the expense of such operations, cheaper solutions to the problem have been sought. In recent years an antifreeze such as methyl alcohol has been added to the natural gas feedstock and passed together with the feedstock through the low temperature heat exchange units. As the water is condensed from the gas, it is absorbed by the alcohol to form a liquid alcohol-water phase which separates from the gaseous feedstock being cooled. While, generally speaking, this process has been more economical than the use of the adsorbing desiccants mentioned above, the process is not without problems. For example, when the heavier hydrocarbons condense from the gas feedstocks in contact with the alcohol-water phase, two liquid phases are present in the equipment, a hydrocarbon phase and a water-alcohol phase. Since the alcohol is also soluble in said hydrocarbon phase, it may transfer from the water phase to the larger volume hydrocarbon phase, leaving insufficient alcohol in the water phase, which will then freeze and plug the equipment.

The present invention is an improvement on the prior art processes utilized in the recovery of antifreeze agents such as methanol from hydrocarbon-containing streams subject to hydrate and ice formation. The present invention provides an improved, economical, and practical method for recovering the antifreeze agent used in preventing hydrate and ice formation in hydrocarbon-containing streams.

Thus, according to the present invention, there is provided a combination process for the recovery of antifreeze agents such as methanol from streams containing same which comprises contacting a stream containing methanol under extraction conditions with water to selectively remove methanol from the stream and form an aqueous extract containing methanol, subjecting the extract to fractionation to separate a substantial portion of the methanol therefrom, and form a bottoms water stream containing residual amounts of methanol which is suitable for recycle to the extraction zone, and passing the remainder of the bottoms water stream to additional stripping to remove residual methanol, leaving water which can be safely disposed or used as desired.

In a preferred embodiment, the bottoms water stream removed from the fractionation zone is heated and flashed to form steam which can be used as a source of direct heat in the fractionation zone and another portion used as indirect heat for the stripping zone and then passed as direct heat to the fractionation.

In another embodiment, the overhead vaporous stream removed from the stripping zone which comprises methanol and steam is passed directly to the fractionation zone as an additional direct heat source for the fractionation.

In another embodiment of the invention, a portion of the heated bottoms stream removed from the fractionation zone is cooled by heat interchange with the feed to the fractionation zone and then passed as solvent to the initial liquid-liquid extraction zone.

In another embodiment of the invention, the flow rate of feed to the initial extraction zone and the flow of solvent water to the extraction zone are both determined and compared, and the ratio between the two streams is used to control the rate of addition to solvent water in the extraction step to maintain the desired flow relationship between the two streams.

The drawing is a diagrammatic illustration of one presently preferred embodiment of the present invention. Referring now to the drawing, the present invention will be more fully explained. The natural gas liquid stream comprising a mixture of ethane, propane, butanes and heavier hydrocarbons, water, and methanol is introduced via conduit 10 into the lower portion of liquid-liquid extractor or contactor 11. The rate of flow of natural gas liquids into contactor 11 is monitored by flow recording controller 12. Natural gas liquids pass upward through column or extractor 11 countercurrently to a descending stream of water introduced into extractor 11 by way of line 13. The rate of flow of water introduced into column 11 is monitored by flow recording controller 14. The rates of flow determined by flow recording controller 12 and flow recording controller 14 are compared by ratio controller 15 responsive to signals from the respective flow recording controllers. The ratio controller 15 adjusts either flow recording controller 12 or flow recording controller 14 responsive to variations in the rate of flow and adjusts one of the controllers to maintain a desired ratio between the two inlet streams into extractor 11.

The contacting of the feed stream containing methanol with water in contactor 11 can be carried out in any convenient or suitable manner under liquid-liquid contacting conditions whereby the feedstream containing methanol passes counter-current upwardly to a descending stream of water. Said extraction zone or vessel can be any suitable type of tower or vessel, for example, a tower provided with any suitable type of contacting device(s) or medium, e.g., sieve trays, or packed with a packing material such as rings or saddles or other suitable contacting devices.

Extractions zone 11 is operated under liquid-liquid contacting conditions sufficient to substantially remove methanol from the feed stream, allowing an overhead stream to be removed therefrom comprising principally natural gas liquid by way of conduit 16. The natural gas liquids can be passed to a pipeline or other suitable desired place. As indicated hereinbefore, extraction zone 11 is operated under conditions of pressure, temperature, and ratio of water to feed such that substantially all of the methanol in the feed is removed with the water by way of line 17. In a preferred mode of operation, column 11 is operated at a pressure of about 385 psia and about 95° F (26.2 atm and 35° C), and the column is filled with a suitable packing material. In general, column 11 can be operated at a temperature in the range of about 50° F (10° C) to about 140° F (60° C) and a pressure of about 175 psia (12 atm) to about 700 psia (48 atm), and in any case should be outside the range in which hydrates will form in the hydrocarbon stream leaving column 11.

The bottoms liquid fraction comprising water and methanol removed by line 17 is passed to feed surge tank 18 and then the liquids removed therefrom by way of line 19 are passed through feed heat exchanger 20 and then introduced into methanol fractionation column 21. The rate of flow of bottoms liquid withdrawal in line 17 is monitored and controlled by flow recording controller 22 which is reset by pressure recording controller 23 responsive to the pressure in the upper portion of column 11 by controller 24. Vapors separated in tank 18 are removed overhead by way of line 25. The rate of flow of water-methanol fed to fractionation column 21 is monitored and controlled by flow recording controller 26.

The water-methanol feed introduced into zone 21 is subjected to distillation conditions sufficient to substantially remove methanol overhead by way of line 27 and water containing residual amounts of methanol by way of line 28. In a preferred embodiment, zone 21 is operated at a pressure of about 40 psia (2.7 atm) and a bottom fractionation temperature of about 270° F (132° C) and a top temperature of about 205° F (96° C). In general, the top temperature for zone 21 can be in the range of about 167° F (75° C) to about 226° F (108° C) with a bottom temperature in the range of about 240° F (115.5° C) to about 295° F (146° C). The pressure can vary from about 25 psia (1.7 atm) to about 60 psia (4.1 atm).

A methanol-rich overhead stream is withdrawn from fractionator 21 by line 27, condensed in condenser 29, and passed to accumulator 30. Liquid is withdrawn from accumulator 30 by way of conduit 31, and a portion is returned as reflux to fractionator 21 by way of line 32; and the remainder is passed by way of conduit 33 to storage or other suitable use. The rate of withdrawal of methanol in conduit 33 is controlled by flow recording controller 34 responsive to the liquid level in accumulator 30 as measured by controller 35.

The liquid bottoms stream removed from fractionator 21 by way of line 28 which comprises water containing residual amounts of methanol is passed by way of lines 28 and 36 to fired reboiler heater 37 wherein the water stream is heated under conditions sufficient that upon flashing in zone 38 there is produced steam which is used as a source of reboiler heat for fractionator 21 as well as for a water stripper subsequently to be described plus providing feed for the water stripper. In a preferred embodiment, the heated stream of water which is partially vaporized is flashed at 302° F and 70 psia (150° C and 4.8 atm) in zone 38. A portion of the steam generated in reboiler heater 37 is passed by way of line 39 directly to fractionator 21 as a part of the reboiler heat for the column. Another portion of the steam produced in reboiler heater 37 is passed by way of line 40 in indirect heat exchange with waste water stripper 41 by indirect heat exchange in heat exchanger 42 and thence through line 43 and line 44 is passed as an additional source of reboiler heat for fractionator 21.

A portion of the liquid effluent from reboiler heater 37 is passed by way of line 45 through heat exchanger 46 and introduced into waste water stripper 41. Another part of the liquid effluent from reboiler heater 37 in line 45 is passed by way of line 47 through fractionator feed heat exchanger 20, line 48, heat exchanger 49, and then introduced into the upper portion of extractor 11 as at least a portion of the water solvent for removing methanol from the feed gas introduced by line 10. Makeup water can be introduced into line 48 by way of line 50.

Fuel is introduced in the reboiler heater by way of line 51. The rate of flow of fuel introduced into reboiler heater 37 is controlled by controller 52 which is reset responsive to the level of liquid measured by controller 53 which measures the liquid level in separator 38. The conditions of temperature and pressure in reboiler heater 37 can vary appreciably, but will generally be in the range of about 240° F (116° C) to about 295° F (146° C) and a pressure of about 25 psia (1.7 atm) to about 60 psia (4.1 atm).

Referring to waste water stripper 41 which is operated under conditions sufficient to substantially remove the residual amounts of methanol from the feed water-methanol mixture introduced by line 45, methanol is taken overhead by way of line 54 and this stream is passed by way of line 44 directly to the lower portion of fractionator 21 as at least a portion of the reboiler heat for that column. The bottoms water stream is removed from column 41 by way of line 55 and a portion of the bottoms is passed through line 56 and reboiler heater 42 and reintroduced into a lower portion of the stripper as a source of heat to strip methanol from the water. The remainder of the bottoms stream is passed by way of line 57 to suitable disposal. The rate of flow of heat exchange fluid passed through heat exchanger 42 is controlled by flow recording controller 58 which is reset responsive to the liquid level in the bottom of stripper 41 as measured by controller 59.

While the invention has been described with particular reference to using methyl alcohol as the antifreeze agent, other such agents can be used in the practice of the invention. Any suitable liquid antifreeze agent can be used. Other suitable agents include ethanol, propanol, isopropanol, and other organic compounds which are completely miscible with water and are more volatile than water.

The waste water stripper 41, in a preferred embodiment, is operated at a pressure of about 50 psia and a temperature of about 280° F (3.4 atm and 138° C) and is packed with suitable packing material. In general, however, the pressure in zone 41 can vary from about 235° F (113° C) to about 300° F (149° C) and the pressure can vary from about 23 psia (1.56 atm) to about 67 psia (4.56 atm).

The following calculated example will serve to further illustrate the invention:

EXAMPLE

Natural gas liquids (NGL), essentially a mixture of ethane, propane and butanes, containing water and methanol antifreeze are fed into the lower section of a 7'$\phi$ × 56' (2.13 meters $\phi$ × 17.1 meters) extractor operating at 385 psia and 96° F (26.2 atm and 36° C) and packed with 1½ (3.8 cm) metal Pall rings for recovery of methanol by countercurrent contacting with 35 gpm (133 l/min) of water. NGL raffinate overhead product passes to an NGL pipeline. Methanol-rich water extract is combined with the aqueous phase from compressor knockout pots and fed to a 4'$\phi$ (122 cm) × 30-tray methanol fractionator operating at 40 psia and 206°–271° F (2.7 atm and 97°–133° C) where methanol is removed as overhead product at a rate of 18.2 gpm (69 l/min). Fractionator bottoms, still containing about 1–2 gpm (4–8 l/min) of dissolved methanol are pumped to a fired reboiler heater where it is partially vaporized and flashed at 302° F and 70 psia (150° C and 4.8 atm) with part of the vapor returning to the methanol fractionator on rate of flow control to reboil that column. The balance of the flashed vapors are used to reboil a waste water stripper by indirect heat exchange and then return to the base of the methanol fractionator. Part of the water from the fired reboiler flash is cooled and returned to the methanol extractor as solvent; the balance is fed to the 18"$\phi$ × 30' (46 cm $\phi$ × 9.1 meters) waste water stripper operating at 50 psia and 280°–281° F (3.4 atm and 138°–139° C) which is packed with 1" (2.5 cm) Pall rings for removal of remaining methanol. The kettle product flow of 1.8 gpm (6.8 l/min) contains about 2 ppm methanol and is suitable for discharge to a disposal pond. Overhead product passes as a vapor to the lower section of the methanol fractionator to aid in reboiling that column and to permit recovery of the contained methanol.

I claim:

1. A process for the recovery of methanol used as an antifreeze agent in hydrocarbon-containing streams which also contain moisture and have a tendency to form hydrates and ice which comprises
   a. contacting said stream containing moisture and methanol with water in an extraction zone under liquid-liquid extraction conditions to separate a bottoms stream comprising water and methanol and an overhead hydrocarbon-containing stream substantially free of the methanol,
   b. passing said bottoms stream separated in (a) to a fractionation zone having direct reboiler heat and operated under conditions sufficient to separate methanol overhead as product for reuse and a bottoms water stream containing residual amounts of methanol,
   c. heating said bottoms water stream obtained in (b) to an elevated temperature and then flashing same under conditions to vaporize controlled quantities of said heated bottoms and form a vapor stream comprising steam and residual amounts of methanol and a liquid stream comprising water and residual amounts of methanol,
   d. passing a portion of the vapor thus formed directly to said fractionation zone in (b) as at least a portion of said direct reboiler heat and utilizing the remainder of said vapor stream as an indirect source of reboiler heat for a stripping zone and then passing same to said fractionation zone in (b) as at least a part of said direct reboiler heat,
   e. recycling a portion of said liquid water stream containing residual amounts of methanol obtained in (c) to said extraction zone in (a) for said contacting and passing the remainder of said liquid water stream to a stripping zone,
   f. subjecting the remainder of said liquid water stream in (e) to stripping conditions to said stripping zone so as to remove as bottoms a water stream substantially free of methanol for reuse or safe disposal, as desired, and an overhead vapor stream comprising methanol, and
   g. passing said overhead vapor stream obtained in (f) directly to said fractionation zone as at least a part of said direct reboiler heat therefor.

2. A process according to claim 1 wherein said bottoms water stream in (c) is heated to a temperature ranging from about 240° F to about 295° F and said stripping zone in (f) is operated at a temperature ranging from about 235° F to about 300° F.

3. A process according to claim 2 wherein said heated bottoms water stream is flashed to form vapor and a liquid comprising water and trace amounts of methanol, a portion of said liquid is passed in indirect heat exchange with the feed to said fractionation zone in step (b) to cool said portion and then said cooled portion is passed to said extraction zone as at least a portion of the solvent to extract methanol in (a), and the remainder of said liquid is passed, after cooling, as feed to said stripping zone.

4. A process according to claim 1 wherein the portion of said vapor passed in indirect heat exchange with said stripping zone is then combined with the overhead from said stripping zone and the combined stream thus formed is passed directly to said fractionation zone as at least part of said direct reboiler heat.

5. A process according to claim 1 wherein said hydrocarbon-containing stream is a natural gas liquid stream comprising a mixture of ethane, propane, and butanes, water and methanol, and further wherein said stream is contacted counter-currently with water in said extraction zone in (a).

6. A process according to claim 1 wherein the rate of flow of feed and the rate of flow of water to said extraction zone are measured and compared and adjusted responsive to the comparison so as to maintain a desired ratio of water introduction to said extraction zone with respect to the rate of flow of the feedstream.

7. A process according to claim 1 wherein
said feed to said extraction zone in (a) is a natural gas liquid stream comprising ethane, propane, butanes, water, and methanol,
said bottoms stream obtained in (b) is heated and flashed to form steam containing residual amounts of methanol prior to recycling in (e) and passage to said stripping zone in (f),
at least a portion of the steam thus formed is returned directly to said fractionation zone in (b) as at least a part of said direct reboiler heat,
at least another portion of steam thus formed is passed in indirect heat exchange with said stripping zone in (f) and then passed directly to said fractionation zone in (b) as additional direct reboiler heat, and
at least another portion of said heated bottoms stream thus formed is passed in indirect heat exchange with feed to said fractionation zone in (b) and the partially cooled stream thus heat exchanged is then passed to said extraction zone in (a) as at least a part of the solvent.

* * * * *